United States Patent [19]

Hoff

[11] 4,268,418

[45] May 19, 1981

[54] POLYMERIZATION CATALYST

[75] Inventor: Raymond E. Hoff, Palatine, Ill.

[73] Assignee: Chemplex Company, Rolling Meadows, Ill.

[21] Appl. No.: 95,470

[22] Filed: Nov. 19, 1979

Related U.S. Application Data

[63] Continuation-in-part of Ser. No. 912,874, Jun. 5, 1978, abandoned.

[51] Int. Cl.³ ............................ C08F 4/02; C08F 4/64
[52] U.S. Cl. ............................ 252/429 B; 252/431 R; 252/431 C; 526/151
[58] Field of Search ........... 252/429 B, 429 C, 431 R, 252/431 C

[56] References Cited

U.S. PATENT DOCUMENTS

| | | | |
|---|---|---|---|
| 3,118,865 | 1/1964 | Bruce et al. | 252/429 C X |
| 3,549,717 | 12/1970 | Itakura et al. | 252/429 B X |
| 3,594,330 | 7/1971 | Delbouille et al. | 252/429 B |
| 3,600,367 | 8/1971 | Delbouille et al. | 252/429 B X |
| 3,624,056 | 11/1971 | Minchak | 252/429 C X |
| 3,670,043 | 6/1972 | Kubicek et al. | 252/429 B X |
| 3,801,558 | 4/1974 | Fletcher et al. | 252/429 B X |
| 3,821,186 | 6/1974 | Grant | 252/429 C X |
| 3,878,124 | 4/1975 | Durano et al. | 252/429 B |
| 3,917,575 | 11/1975 | Matsuura et al. | 252/429 B X |
| 3,953,414 | 4/1976 | Galli et al. | 252/429 C X |
| 3,995,098 | 11/1976 | Avaro et al. | 252/429 C X |
| 4,004,071 | 1/1977 | Aisnima et al. | 252/429 C X |
| 4,021,599 | 5/1977 | Kochhar et al. | 252/431 R X |
| 4,166,167 | 8/1979 | Bye et al. | 526/142 |
| 4,173,547 | 11/1979 | Graff | 252/429 B |

FOREIGN PATENT DOCUMENTS

| | | |
|---|---|---|
| 996299 | 8/1976 | Canada. |
| 1930010 | 12/1970 | Fed. Rep. of Germany. |
| 2211486 | 9/1972 | Fed. Rep. of Germany. |
| 1436426 | 5/1976 | United Kingdom. |

*Primary Examiner*—Patrick Garvin
*Attorney, Agent, or Firm*—Wegner, Stellman, McCord, Wiles & Wood

[57] ABSTRACT

A novel olefin polymerization and copolymerization catalyst and method is provided wherein the catalyst is prepared by mixing an alkyl aluminum halide, a dialkyl magnesium compound and a reducible titanium compound of the formula $Ti(OR)_nX_{4-n}$ where R is an alkyl group, preferably of 1–6 carbon atoms, X is a halogen atom, and n is an integer between 0 and 4, inclusive, in the presence of a solvent and a particulate organic polymer whereby a reaction product is formed on the particles, and evaporating the solvent. The catalyst is active in the presence of an organometallic co-catalyst.

34 Claims, No Drawings

POLYMERIZATION CATALYST

CROSS-REFERENCE TO RELATED APPLICATION

This is a continuation-in-part of co-pending application Ser. No. 912,874 filed June 5, 1978 and now abandoned.

BACKGROUND OF THE INVENTION

The catalyst of this invention is suitable for the polymerization and copolymerization of ethylene and other 1-olefins, particularly of 2–8 carbon atoms, and the copolymerization of these with 1-olefins of 2–20 carbon atoms, such as propylene, butene and hexene, for example. It is well suited for economical particle form and gas phase polymerization processes. The active component of the catalyst is supported upon particles of an organic polymer, the selection of which affects the particle size, melt index and molecular weight distribution of the product polymer. Further, product bulk density is relatively high and is controllable by selection of the polymeric carrier.

SUMMARY OF THE INVENTION

An improved catalyst for the polymerization and copolymerization of olefins is prepared by combining three reactive materials in the presence of particles of an organic polymeric carrier. A reaction product of the three reactive materials is formed on and adheres to the carrier and is activated by contact with an effective quantity of an organometallic co-catalyst, such as trialkyl aluminum, for example.

The supported reaction product is believed to be a complex of the three reactive materials, and incorporates a major portion of the available titanium in a highly active form over a wide range of mole ratios of the reactants. Due to the inherent high reactivity of the complex, it is not necessary to remove non-reactive titanium from the catalyst, but washing of the catalyst may be conducted, if desired.

The catalyst is, because of its high activity, well suited for use in the particle form polymerization process in which the supported catalyst, the co-catalyst, and olefin monomer are contacted in a suitable solvent or in a gas phase process in which no solvent is necessary.

The three reactive materials may be added to the carrier in any order and comprise (1) an alkyl aluminum halide, (2) a dialkyl magnesium compound or a complex of dialkyl magnesium and alkyl aluminum compounds, and (3) a titanium alkoxide, a titanium alkoxide halide, or a titanium halide.

The alkyl aluminum halide is chosen from the group comprising dialkyl aluminum halides, alkyl aluminum sesquihalides, and alkyl aluminum dihalides, with ethyl aluminum sesquichloride being preferred. The titanium compound is of the formula $Ti(OR)_nX_{4-n}$ where R is an alkyl group, X is a halogen atom, and n is an integer between 0 and 4, inclusive. A preferred titanium compound is titanium tetraisopropoxide.

Preferred dialkyl magnesium compounds are dibutyl magnesium, di-n-hexyl magnesium and butyl ethyl magnesium, any of which may be complexed with an alkyl aluminum compound, such as a trialkyl aluminum, to increase the solubility of the magnesium compound and/or decrease the viscosity of the magnesium compound solution.

DESCRIPTION OF THE PREFERRED EMBODIMENTS

Preparation of the Carrier

The reaction product catalyst of the invention forms and adheres to the surface of polymeric carrier particles to a degree dependent upon the physical and chemical nature of the carrier material. Similarly, the characteristics of the product polymer which grows from the catalyst surface is determined by the carrier characteristics.

In order for a particle form polymerization reaction to proceed by polymer growth on the carrier, it is obviously necessary that the carrier particles remain intact (i.e., not melt, dissolve or otherwise degrade) under reaction conditions. Particle form polymerization may be conducted at temperatures up to 110° C. in a hydrocarbon solvent such as isobutane, for example. Therefore, a polymeric carrier which melts or otherwise degrades at temperatures up to 110° C., or which dissolves in isobutane or a similar solvent at these temperatures, is not a suitable catalyst support.

Further, the carrier material must be substantially chemically inert with respect to the catalyst formed thereon. It has been found that a very high concentration of polar groups in the carrier material results in reaction of the catayst forming reactants with the carrier and therefore should be avoided. However, a relatively small amount of polar groups in the carrier is useful in promoting adherence and uniform distribution of the catalyst thereon. Such adherence may also be promoted by blending up to about 20 percent of an amorphous or only slightly crystalline hydrocarbon polymer into a predominantly crystalline polymeric carrier material.

It has been found that production of carrier particles by grinding of carrier material results in a carrier surface which promotes adherence of the catalyst to the carrier. The technique known as cryogenic grinding is especially preferred. The carrier particles may range in diameter from about 20 microns to about 5 millimeters.

For use in automatic catalyst feeding valves commonly used in particle form polymerization plants, relatively small particles are generally preferred, although alternate methods of feeding can be employed for larger carrier particles. In addition, normal feeding valves operate most effectively with materials having flow characteristics similar to those of commonly used silica catalysts. Approximately spherical carrier particles are especially suitable for use in such automatic valves. Furthermore, flow properties of the carrier are improved by the addition of a small amount, such as up to about 10% by weight, of pyrogenic silica such as the silica having the trade name Cab-O-Sil, for example.

Specific examples of suitable carrier materials are high density polyethylene and isotactic polypropylene. U.S. Pat. No. 3,873,643, assigned to the assignee hereof, provides an excellent example of a polymer which contains low concentrations of polar groups and which is suitable for use as a carrier in this invention. The material of U.S. Pat. No. 3,873,643 comprises high density polyethylene grafted with organic anhydrides.

More specifically, the polymers disclosed in Wu et at. U.S. Pat. No. 3,873,643 are characterized as copolymers comprising polyolefins which are modified by grafted cyclic and polycyclic unsaturated acid or acid anhydride monomers, or both, which exhibit improved compatability with other materials, and which are chemically reactive.

By polyolefins, it is meant polymers and copolymers of ethylene, propylene, butenes and other unsaturated aliphatic hydrocarbons. Suitable polyolefins include ethylene homopolymers prepared by low pressure methods (linear or high density polyethylenes) and copolymers of ethylene with up to 40 weight percent of such higher olefins as propylene, 1-butene and 1-hexene. The copolymers may contain up to 5% of such di- or triolefins which are used commercially in ethylene-propylene terpolymers such as ethylidene-norbornene, methylenenorbornene, 1,4-hexadiene and vinylnorbornene. Also, it is preferable sometimes to graft to blends of two or more of the above homopolymers, copolymers and terpolymers.

By cyclic and polycyclic unsaturated acids and anhydrides, it is meant compounds which contain one or more carboxylic and/or heterocyclic moieties not including the anhydride ring. The rings may be simple, fused, bridged, spiro, joined directly, joined through aliphatic chains containing one or more carbon, oxygen or sulfur atoms, or combinations of the above ring arrangements. These classes are represented respectively by the following structures which are meant to be illustrative rather than limiting:

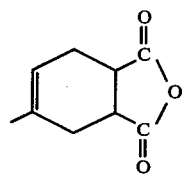

simple
4-methyl cyclohex-4-ene
1,2-dicarboxylic acid anhydride
(4-MTHPA)

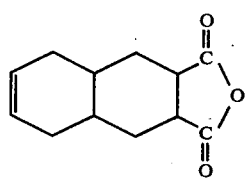

fused
1,2,3,4,5,8,9,10-octahydro naphthalene-2,3-dicarboxylic acid anhydride

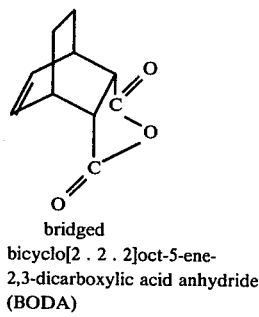

bridged
bicyclo[2.2.2]oct-5-ene-2,3-dicarboxylic acid anhydride
(BODA)

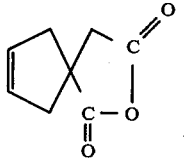

spiro
2-oxa-1,3-diketospiro[4,4]non-7-ene

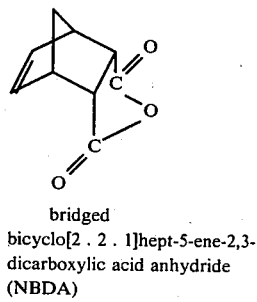

bridged
bicyclo[2.2.1]hept-5-ene-2,3-dicarboxylic acid anhydride
(NBDA)

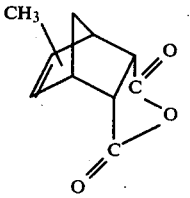

bridged, mixtures of isomers
x-methyl bicyclo[2.2.1]hept-5-ene-2,3-dicarboxylic acid anhydride (XMNA)

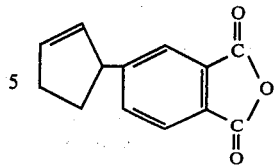

joined directly and aromatic
4-(2-cyclopentyl)-benzene 1,2-dicarboxylic acid anhydride

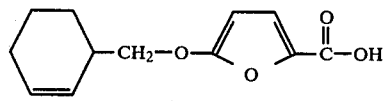

joined thru an aliphatic chain and heterocyclic
5-(2-cyclohexenyl methyloxy)-2-furoic acid

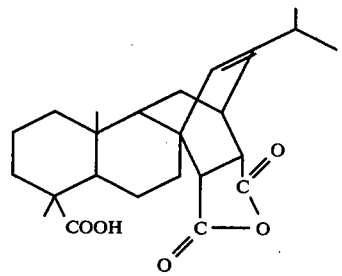

both fused and bridged rings
maleo-pimaric acid (M-PA)

Rings may contain 3 to 8 atoms but generally 5 and 6 membered rings are preferred. The monomer may contain aromatic rings but at least one ring should be aliphatic. The olefinic bond is preferably unconjugated with the acid or anhydride groups. Such conjugated monomers as acrylic acid, methacrylic acid, itaconic anhydride and fumaric acid polymerize too fast for the successful practice of this invention. If, however, the olefinic bond is conjugated but otherwise deactivated as by alkyl substitution, the monomer can be used in this application. A non-limiting example of such a conjugated but deactivated monomer is cyclohex-1-ene, 2-dicarboxylic anhydride.

The copolymers consist of about 70–99.95 weight percent of polyolefin and about 0.05–30 weight percent of the cyclic unsaturated acid or acid anhydride or mixtures and these resulting graft copolymers are capable of blending or reacting with a wide variety of other materials to modify the copolymer further.

The polyolefin used in making the graft polymer carrier material used in this invention may comprise a polyethylene homopolymer with a density of at least about 0.940–0.965 and may be essentially linear.

The polyolefin may also comprise a terpolymer such as one of ethylene, propylene and up to about 5 weight percent of a cyclic or acyclic aliphatic diene or mixtures thereof.

Excellent monomers in the graft copolymer of this invention include 4-methylcyclohex-4-ene-1,2-dicarboxylic acid anhydride, tetrahydrophthalic anhydride, x-methylnorborn-5-ene-2,3-dicarboxylic anhydride, norborn-5-ene-2,3-dicarboxylic anhydride, 2-cyclopentenyl acetic acid, abietic acid, maleopimaric acid and bicyclo[2.2.2]oct-5-ene-2,3-dicarboxylic anhydride.

Methods of preparing graft copolymers such as described above are set forth in detail in Wu et al. U.S. Pat. No. 3,873,643.

CATALYST FORMING REACTANTS

The catalyst of the invention comprises the reaction product of (1) an alkyl aluminum halide, (2) a dialkyl magnesium compound or complex, and (3) a titanium alkoxide, alkoxide halide or halide, supported on an organic carrier as described above and used in the presence of an organometallic co-catalyst, preferably an alkyl aluminum compound. The reaction of the three components may be carried out at room temperature or below in the presence of carrier particles and is conducted in a suitable solvent such as isobutane, for example.

The alkyl aluminum halide is chosen from the group comprising dialkyl aluminum halides, alkyl aluminum sesquihalides and alkyl aluminum dihalides. A preferred alkyl aluminum halide is ethyl aluminum sesquichloride.

The dialkyl magnesium compound, which may be in the form of an alkyl aluminum complex, is preferably dibutyl magnesium, di-n-hexyl magnesium or butyl ethyl magnesium.

The titanium compound is an alkoxide, mixed alkoxide halide, or halide of the formula $Ti(OR)_n X_{4-n}$ where R is an alkyl group of 1–6 carbon atoms, X is a halogen atom, and n is an integer between 0 and 4, inclusive. Titanium tetraisopropoxide is preferred.

Prior catalysts utilizing aluminum chloride or another chloride tend to be corrosive and require special handling equipment. A washing step is also required to remove residual chloride from the catalyst. In the practice of the present invention, the alkyl aluminum halide and the titanium alkoxide halide, if any, complex with the dialkyl magnesium compound to substantially the fullest possible extent regardless of the respective mole ratios of these components over a wide range of ratios, thereby eliminating residue from the catalyst surface, as well as effecting a reduction in lost titanium and magnesium. Hence no special equipment is necessary for handling the catalyst of the invention, nor is a washing step necessary.

The three reactive components may be in hydrocarbon solution and, when reacted in the presence of a solvent and polymeric carrier particles of the type described, deposit an insoluble reaction product on the surface of the particles. The mixing of the reactive materials is preferably done at or below room temperature. After the mixing is complete, the solvent is evaporated, preferably by heating above room temperature but at a temperature less than the softening temperature of the polymeric carrier. The evaporation step promotes the formation of particles, as opposed to irregularly sized chunks, in a slurry polymerization reaction utilizing the resulting catalyst, and decreases reactor fouling.

It is normally best to heat the catalyst under inert gas at a temperature of about 90°–100° C. for from ½ to 10 hours, or until free of solvent.

The amount of the titanium component is chosen to give preferably about 0.1 to 10% by weight titanium in the reaction product. The respective quantities of the titanium, magnesium and aluminum halide compounds are preferably selected such that the weight of the reaction product supported on the polymeric carrier particles is less than about 30% of the total weight of the particles and reaction product. The respective mole ratios of the alkyl aluminum halide, the dialkyl magnesium and the titanium compound may be adjusted to give optimum reactivity or to modify polymer properties.

Further, the mole ratio of the co-catalyst to the solid catalyst may be adjusted, and hydrogen may be supplied to the polymerization reaction system to control product molecular weight, as is well-known in the art.

REACTION CONDITIONS

The particle form reaction system is characterized by the introduction of monomer to an agitated catalyst-solvent slurry. The solvent is typically isobutane and the reaction is best carried out in a closed vessel to facilitate pressure and temperature regulation. Pressure may be regulated by the addition of nitrogen and/or hydrogen to the vessel. Addition of the latter is useful for regulation of the molecular weight of product polymer, as described in the following examples.

Particle form polymerization of ethylene with the catalyst of this invention is best carried out at about 105° C. to 110° C. at a pressure of between 35 and 40 atmospheres. In gas phase polymerization, the temperature may range from less than about 85° C. to about 100° C. with a pressure as low as about 20 atmospheres. Copolymers may be produced by either process by addition of propylene, butene-1, hexene-1 and similar alpha-olefins to the reactor. Production of copolymers of relatively low density is preferably carried out at a relatively low temperature.

EXAMPLE 1

Pellets of high density polyethylene with 1.33 weight percent X-methylbicyclo[2.2.1]hept-5-ene-2,3-dicarboxylic acid anhydride grafted to it, as described in U.S. Pat. No. 3,873,643 and herein identified as XMNA graft, were ground to particles of about 1 mm in diameter. 10 grams of XMNA particles was charged to a flask from which air was removed by $N_2$ purge. 20 ml each of cyclohexane and a heptane solution of ethyl aluminum sesquichloride (7.7 mmoles $Et_3Al_2Cl_3$) were added while stirring vigorously.

10 ml of a heptane solution of a dibutyl magnesium/triethyl aluminum complex (9.1 mmole magnesium and 1.5 mmole triethyl aluminum) were quickly introduced to a flask while stirring. 2.0 ml (6.64 mmoles) of pure titanium tetraisopropoxide was added to the resulting slurry, and the color of the mixture became very dark. The solvent was evaporated and the catalyst was heat-aged by heating at 90° C. for 30 minutes under the $N_2$ purge. The remaining solid material was then tested as a supported ethylene polymerization catalyst.

In a first polymerization test, 0.2230 g of the solid material was charged, under $N_2$, to a closed polymerization vessel. 500 ml isobutane was forced into the vessel and ethylene was added to maintain the total pressure at 550 psig. The vessel was maintained at 105° C. throughout the reaction. In 25 minutes, 6 grams of polyethylene was produced for an hourly reactivity with respect to the solid catalyst of 65 g/g.

In a second polymerization test, the procedure was identical except that 0.0958 g of the catalyst and 0.3 ml (0.28 mmole) of triisobutyl aluminum (TIBAL) solution were charged to the polymerization vessel. In this case, the reactivity was 910 g/g/hr with respect to the solid catalyst, 580 g/g/hr with respect to the total catalyst weight including the triisobutyl aluminum, and 134,000 g/g/hr with respect to titanium, clearly showing the beneficial effect of using a triisobutyl aluminum cocatalyst. The solid catayst is calculated to be 1.17 weight percent titanium on a solvent-free basis and the molar ratio of triisobutyl aluminum to titanium was 12/1.

EXAMPLE 2

A solid catalyst component was prepared according to the procedure described in Example 1, except that 20 grams of XMNA was used and no cyclohexane was added. An ethylene polymerization test was conducted at 105° C. and 550 psig using 0.0838 g of solid catalyst and a 6/1 molar ratio of TIBAL to titanium. The hourly catalyst reactivity was 920 g/g and the hourly reactivity based on titanium was 105,000 g/g. The product polyethylene was predominantly in the form of particles 1 to 2 centimeters in diameter, together with a minor amount of fragments produced by the reactor agitator. The bulk density of the product was a desirably high 0.30 g/cm$^3$ and no product particles adhered to the reactor wall.

EXAMPLE 3

A quantity of XMNA graft was ground to approximately 30 mesh in a Wiley-type laboratory mill. 10 grams of the resulting powder was then incorporated in a solid catalyst by the procedure of Example 1. 0.1656 g of solid catalyst was used in an ethylene polymerization test with 1.0 ml (0.92 mmole) TIBAL solution. The Al/Ti mole ratio was 22.8/1. The polymerization reaction was conducted at 105° C. and 550 psig.

In this test, the total hourly catalyst reactivity was 400 g/g and the titanium reactivity was 77,200 g/g/hr. The product polyethylene was in the form of particles 3-5 mm in diameter, and none adhered to the reactor walls. With reference to Example 2, it is apparent that reduction in carrier size effects a reduction in product particle size. The product bulk density was again 0.3 g/cm$^3$.

EXAMPLE 4

The carrier used in this example was XMNA graft ground by a cryogenic technique and sieved. Only particles which passed through a 140 mesh sieve were retained for use in the catalyst. 10 grams of XMNA particles was added to a nitrogen purged flask, as in Example 1. 10 ml of ethyl aluminum sesquichloride solution and 5 ml of the dibutyl magnesium/triethyl aluminum complex solution of Example 1 were rapidly introduced while stirring, followed by introduction of 1.0 ml titanium tetraisopropoxide for a titanium content of 1.17 weight percent on a solvent-free basis. The solvent was evaporated as in Example 1.

0.0905 g solid catalyst was used in an ethylene polymerization test under conditions identical to those of Example 1 except that the mole ratio of TIBAL to titanium was 26/1. The total catalyst reactivity was found to be 860 g/g/hr with a titanium reactivity of 179,000 g/g/hr.

EXAMPLE 5

A further polymerization test was made with the catalyst and reactants of Example 4, with the weight of solid catalyst being 0.0352 g and with a mole ratio of TIBAL to titanium of 25/1. The test was conducted at 105° C. and 550 psig. The total catalyst reactivity was 1160 g/g/hr and the titanium reactivity was 260,000 g/g/hr. The average particle size of the product was less than about 1 mm, with the bulk density again being 0.3 g/cm$^3$, providing a further illustration of the effect of carrier particle size on product particle size. (See Examples 2 and 3.)

EXAMPLES 6-9

A supported catalyst was prepared from cryogenically ground XMNA graft as described in Example 4. A series of four polymerization tests was conducted with this catalyst using a TIBAL to titanium mole ratio of about 25/1 and a polymerization temperature of 107° C. After the addition of solid catalyst and TIBAL, isobutane was introduced into the closed reaction vessel, followed by ethylene. In three runs, hydrogen was added to the reactor to increase the pressure by the amount stated below followed by more ethylene to maintain the pressure at 550 psig. The resulting reactivities are given below:

| Exam. No. | Hydrogen Added | Catalyst Hourly Reactivity (g/g/hr) | | | |
|---|---|---|---|---|---|
| | | Total Catalyst | Titanium | HLMI | MI |
| 6 | 0 | 1620 | 280,500 | 0.1 | — |
| 7 | 100 psig | 440 | 76,500 | — | 6.9 |
| 8 | 75 psig | 710 | 123,300 | — | 4.0 |
| 9 | 50 psig | 660 | 115,600 | — | 1.6 |

The number of vinyl groups in the product of Example 7 was found to be 0.40/2000 carbon atoms. This example illustrates that the melt index of product polyethylene is directly related to hydrogen partial pressure in the reaction system. Moreover, vinyl unsaturation of the product is shown to be desirably low, thereby increasing the resistance of the product polymer to oxidative degradation under processing conditions.

EXAMPLES 10-11

The solid catalyst used in these examples was the same as used in Examples 6-9. The co-catalyst was a mixture of TIBAL and diethylzinc (DEZ). In each run, 50 psig partial pressure of hydrogen was added to the reactor and the temperature and total pressure were maintained at 109° C. and 550 psig, respectively. The results are given below:

| Exam. No. | Co-catalyst | Catalyst Hourly Reactivity (g/g/hr) | | |
|---|---|---|---|---|
| | | Catalyst | Titanium | MI |
| 10 | 0.43 mmole TIBAL + 0.17 mmole DEZ | 820 | 161,200 | 1.3 |
| 11 | 0.18 mmole TIBAL + 0.18 mmole DEZ | 310 | 73,500 | 1.8 |

In Example 10, the weight of solid catalyst was 0.0786 g and 0.0498 g of catalyst was used in Example 11. The titanium weight percentage was 1.17% in each case. These examples show that a mixture of alkyl zinc and aluminum compounds may be used as a co-catalyst without significantly affecting the melt index of the product polyethylene.

EXAMPLE 12

The carrier of this example was a polyolefin powder with an impact modifier generally used in rotational molding applications. The carrier had a density of about 0.950 g/cm$^3$ and a melt index of 6.5. Ten grams of carrier was mixed with ethyl aluminum sesquichloride, dibutyl magnesium/triethyl aluminum complex solution and titanium tetraisopropoxide, as described in Example 4. After evaporation of solvent as described in Example 1, 0.0718 g of the resulting solid catalyst and 0.42 ml of TIBAL solution (0.92 M in heptane) were introduced to a polymerization vessel and an ethylene polymerization was conducted at 105° C. and a total pressure of 550 psig with 50 psig hydrogen partial pressure.

The reaction was continued for 90 minutes to yield 160 grams of polyethylene particles having a bulk density of 0.33 g/cm$^3$. The hourly reactivity was 185,600 g/g based on titanium and 1700 g/g based on total catalyst. The melt index was 4.8 and the high load melt index was 101. A relatively low ratio of high load to normal melt index of 21 indicates a relatively narrow molecular weight distribution and a desirably low product shear sensitivity.

EXAMPLE 13

A polymerization test was conducted with the solid catalyst of Example 12. A heptane solution of trihexylaluminum was substituted for TIBAL as the co-catalyst. The molar ratio of trihexylaluminum to titanium was 15.7/1. 50 psig of hydrogen was added, followed by the introduction of ethylene, and the reaction was conducted at 105° C. and 550 psig total pressure. The hourly reactivity based on solid catalyst was 1200 g/g and 99,300 g/g based on titanium. The melt index was 2.4, the high load melt index was 79, and the ratio of high load melt index to melt index was 32.8. The product bulk density was 0.26 g/cm$^3$.

EXAMPLE 14

An ethylene polymerization test was conducted with the solid catalyst of Example 12. The co-catalyst was diisobutyl aluminum hydride in molar ratio to titanium of 15.7/1. The polymerization conditions were identical to those of Example 9. The hourly reactivity based on solid catalyst was 1010 g/g and 84,500 g/g based on titanium. The melt index was 3.7 and the high load melt index was 95.1, for a ratio of high to normal melt index of 26. The product bulk density was 0.31 g/cm$^3$.

EXAMPLE 15

In this example, the carrier was a sample of the cryogenically ground XMNA graft of Examples 6–9. 10 grams of the XMNA graft was charged to an N$_2$ purged flask and air was removed, followed by addition of 1.0 ml of titanium tetraisopropoxide. The mixture was then heated with a hot air gun under N$_2$ purge until condensation of liquid on the upper portion of the flask ceased. 10 ml of a heptane solution of ethyl aluminum sesquichloride (15.4 mmoles Al) and 10 ml of a heptane solution of dibutyl magnesium/aluminum complex (4.6 mmoles Bu$_2$Mg and 0.75 mmoles Al) were added. Solvent was evaporated by bath heating of the catalyst at 100° C. for 30 minutes under an N$_2$ purge to result in a solvent-free solid catalyst.

In an ethylene polymerization test, 0.0457 g of solid catalyst was mixed with 0.27 ml (0.25 mmole) of TIBAL solution and 50 psig hydrogen was added as previously described. The reaction was run for 150 minutes at 105° C. and a total pressure of 550 psig. The hourly yield was 1050 g/g based on solid catalyst and 88,000 g/g based on titanium.

A sample of the polymer was pyrolized under standard conditions to leave an ash of 60 ppm. This ash level is satisfactory for all commercial applications, and thus it is demonstrated that the removal of catalyst residues is unnecessary. It has been found, however, that if the supported reaction product catalyst exceeds about 30 weight percent of the total of the reaction product and the polymeric carrier, an unsatisfactory ash level results.

The melt index of the product was 2.7, the high load melt index was 77, and the radio of the two was 28.4/1. The bulk density was 0.31 g/cm$^3$ and the number of vinyl groups was 0.4 per 2000 carbon atoms. This example illustrates that the order of mixing of the three reagents with the carrier does not affect catalytic activity. Other mixing sequences were also tested with similar results.

EXAMPLE 16

In this example a finely divided high density polyethylene with an average particle size of about 20 microns was used as the carrier. A 10 gram quantity of the powder was introduced to a flask purged of air by stirring under an N$_2$ stream for 30 minutes at room temperature. Three catalyst forming reactants were added to the flask in the following order, while agitation by a magnet bar continued:

(1) 10 ml of 25% ethyl aluminum sesquichloride in heptane;

(2) 10 ml of 10% dibutyl magnesium-triethyl aluminum complex in heptane; and (3) a volume of pentane solution containing 0.1 ml of titanium tetraisopropoxide The solvent was evaporated by heating for 30 minutes at 90° C. under a flow of dry N$_2$. The calculated titanium concentration of this material was 0.10 weight percent.

3.0 ml of a 25% TIBAL solution per gram of solid catalyst was added and a particle form ethylene polymerization test was conducted at 105° C. and a total pressure of 550 psig with 50 psig hydrogen. The total catalyst reactivity including the TIBAL was 1244 g/g/hr and the reactivity based on titanium was 1,525,000 g/g/hr. The melt index of the particle form product was 0.20.

EXAMPLE 17

A catalyst was prepared by using the XMNA graft carrier of Example 4. 10 grams of the powder was purged with N$_2$ and subsequently combined with 7.5 ml of ethyl aluminum sesquichloride solution (5.8 mmoles in heptane), 6.5 ml of butyl ethyl magnesium (3.85 mmoles in heptane) and 0.6 ml of pentane solution containing 0.33 mole of titanium tetraisopropoxide. The solvent was evaporated by heating under N$_2$ for 30 minutes at a temperature of 90° C. The calculated titanium content of this material was 0.11 weight percent.

An ethylene polymerization test was conducted as previously described at 105° C. and 550 psig total pressure, with 75 psig hydrogen. The total catalyst reactivity was 1000 g/g/hr and the reactivity with respect to titanium was 1,170,000 g/g/hr. The melt index of the product polyethylene was 1.14.

EXAMPLE 18

10 g of Microthene high density polyethylene powder was added to a dry, nitrogen purged flask and agitated with a magnet bar for one hour while maintaining the nitrogen purge. The following reactants were added successively at room temperature while agitating continued:
(1) 7.5 ml of 25% ethyl aluminum sesquichloride in heptane;
(2) 6.5 ml of 10% of butyl ethyl magnesium in heptane; and
(3) 0.10 ml of titanium tetrachloride.

The composition was stirred for a few minutes to give a uniform color, followed by evaporation of the heptane solvent by immersion of the flask in an ethylene glycol bath for 30 minutes at 90° C. under the nitrogen flow.

A quantity of the resulting catalyst was tested in a batch reactor under particle form conditions. The polymerization temperature was 221° F., and total pressure was maintained at 550 psig with a hydrogen partial pressure of 50 psig. 9.2 mmoles of TIBAL co-catalyst per gram of solid catalyst component was used. The yield of particle form polyethylene based on the solid component was 421 g/g/hr and the reactivity based on titanium was 119,000 g/g/hr.

EXAMPLE 19

A reaction mixture of titanium tetrachloride and titanium tetraisopropoxide in amounts selected to result in an average composition corresponding to titanium diisopropoxide dichloride was prepared, as follows. One milliliter (3.32 mmoles) of titanium tetraisopropoxide was added to 18 ml of dry heptane under a nitrogen atmosphere. 0.38 milliliter (3.38 mmoles) of titanium tetrachloride was then added and a white precipitate formed. The reaction mixture was maintained at room temperature for one hour.

10 g quantity of cryogenically ground XMNA powder was put into a dry, nitrogen purged flask. The powder was stirred for one hour under the nitrogen purge, and the following were added during stirring in the following order:
(1) 7.5 ml of 25% ethylaluminum sesquichloride in heptane;
(2) 10.0 ml of an 8.9% solution of a magnesium/aluminum complex of the formula $(Bu_2Mg)_{6.1}(Et_3Al)$ in heptane; and
(3) 2.0 ml of the above described titanium diisopropoxide dichloride reaction mixture.

As soon as the third reactant was added, the flask was immersed in a heating bath at 90° C. for 30 minutes and heptane was evaporated under nitrogen purge.

A quantity of the resulting catalyst was tested in a batch reactor under particle form polymerization conditions at 215° F. and a total pressure was 550 psig with 50 psig hydrogen partial pressure. 2.7 mmoles of TIBAL co-catalyst per gram of solid XMNA catalyst was used.

The polyethylene yield based on solid catalyst was 687 g/g/hr, and the reactivity based on titanium was about 254,000 g/g/hr. The product polyethylene was granular and of a substantially uniform particle size.

All parts and percentages herein are by weight.

Abbreviations used herein to identify chemical ingredients and product characteristics include:
DEZ—diethylzinc
HLMI—high load melt index
MI—melt index
TIBAL—Triisobutylaluminum
XMNA—an X-methyl bicyclo[2.2.1]hept-5-ene-2,3-dicarboxylic acid anhydride grafted polyethylene, as described in U.S. Pat. No. 3,873,643.

I claim:

1. A supported olefin polymerization and copolymerization catalyst active in the presence of an organometallic co-catalyst prepared by mixing reactive materials comprising a lower alkyl aluminum halide, a dialkyl magnesium compound and a reducible titanium compound of the formula $Ti(OR)_nX_{4-n}$ where R is an alkyl group, X is a halogen atom, and n is an integer between 0 and 4, inclusive, in the presence of a solvent and a particulate organic polymer to form a reaction product supported on said particles, said particulate organic polymer comprising a graft copolymer of about 70–99.95 weight percent of a polyolefin polymer and about 30–0.05 weight percent of at least one monomer selected from the group consisting of polymerizable cyclic and polycyclic ethylenically unsaturated carboxylic acids and carboxylic acid anhydrides, and evaporating said solvent at a temperature which is less than the softening temperature of said organic polymer.

2. The catalyst of claim 1 wherein less than about 5% by weight of the total of said reaction product and said organic polymer particles comprises titanium.

3. The catalyst of claim 1 wherein about 0.1–10% by weight of the total of said reaction product and said organic polymer particles comprises titanium.

4. The catalyst of claim 1 wherein said lower alkyl aluminum halide is chosen from the group consisting essentially of di-lower alkyl aluminum halides, lower alkyl aluminum sesquihalides and lower alkyl aluminum dihalides.

5. The catalyst of claim 4 wherein said lower alkyl aluminum halide comprises ethyl aluminum sesquichloride.

6. The catalyst of claim 1 wherein said dialkyl magnesium compound comprises dibutyl magnesium.

7. The catalyst of claim 1 wherein said dialkyl magnesium compound comprises di-n-hexyl magnesium.

8. The catalyst of claim 1 wherein said dialkyl magnesium compound comprises butyl ethyl magnesium.

9. The catalyst of claim 1 wherein said dialkyl magnesium compound comprises a magnesium complex of trialkyl aluminum.

10. The catalyst of claim 1 wherein said titanium compound comprises titanium tetraisopropoxide.

11. The catalyst of claim 1 wherein said titanium compound comprises titanium tetrachloride.

12. The catalyst of claim 1 wherein said titanium compound comprises a titanium dialkoxy dihalide.

13. The catalyst of claim 12 wherein said titanium dialkoxy dihalide comprises titanium diisopropoxide dichloride.

14. The catalyst of claim 1 wherein said reactive materials are present in amounts to produce a quantity of said reaction product which is less than about 30 percent of the total weight of said reaction product and said organic polymer particles.

15. A supported olefin polymerization and copolymerization catalyst active in the presence of an organometallic cocatalyst prepared by mixing reactive materials comprising a lower alkyl aluminum halide, a dialkyl magnesium compound and a reducible titanium compound of the formula $Ti(OR)_nX_{4-n}$ where R is an alkyl group, X is a halogen atom, and n is an integer between 0 and 4, inclusive, in the presence of a solvent and a particulate organic polymer consisting essentially of high density polyethylene which has chemically bonded to it between about 0.05 and about 30 weight percent of an organic carboxylic acid or acid anhydride to form a reaction product supported on said particles, and evaporating said solvent at a temperature which is less than the softening temperature of said organic polymer.

16. The catalyst of claim 15 wherein said organic polymer is an X-methyl bicyclo[2.2.1]hept-5-ene-2,3-dicarboxylic acid anhydride grafted polyethylene.

17. A supported olefin polymerization and copolymerization catalyst active in the presence of an organometallic co-catalyst prepared by mixing reactive materials comprising a lower alkyl aluminum halide, a dialkyl magnesium compound and a reducible titanium compound of the formula $Ti(OR)_nX_{4-n}$ where R is an alkyl group, X is a halogen atom, and n is an integer between 0 and 4, inclusive, in the presence of a solvent and a particulate organic polymer to form a reaction product supported on said particles, said particulate organic polymer comprising a graft copolymer of about 70–99.95 weight percent of a polyolefin polymer and about 30–0.05 weight percent of at least one monomer selected from the group consisting of polymerizable cyclic ethylenically unsaturated carboxylic acids and carboxylic acid anhydrides, said reactive materials being present in amounts to produce a quantity of said reaction product which is less than about 30 percent of the total weight of said reaction product and said organic polymer particles, and evaporating said solvent at a temperature which is less than the softening temperature of said organic polymer.

18. The method of preparing a supported olefin polymerization and copolymerization catalyst active in the presence of an organometallic co-catalyst comprising mixing reactive materials comprising a lower alkyl aluminum halide, a dialkyl magnesium compound and a reducible titanium compound of the formula $Ti(OR)_nX_{4-n}$ where R is an alkyl group, X is a halogen atom, and n is an integer between 0 and 4, inclusive, in the presence of a solvent and a particulate organic polymer to form a reaction product supported on said particles, said particulate organic polymer comprising a graft copolymer of about 70–99.95 weight percent of a polyolefin polymer and about 30–0.05 weight percent of at least one monomer selected from the group consisting of polymerizable cyclic and polycyclic ethylenically unsaturated carboxylic acids and carboxylic acid anhydrides, and evaporating said solvent at a temperature which is less than the softening temperature of said organic polymer.

19. The catalyst preparation method of claim 18 wherein less than about 5% by weight of the total of said reaction product and said organic polymer particles comprises titanium.

20. The catalyst preparation method of claim 18 wherein about 0.1–10% by weight of the total of said reaction product and said organic polymer particles comprises titanium.

21. The catalyst preparation method of claim 18 wherein said lower alkyl aluminum halide is chosen from the group consisting essentially of di-lower alkyl aluminum halides, lower alkyl aluminum sesquihalides and lower alkyl aluminum dihalides.

22. The catalyst preparation method of claim 21 wherein said lower alkyl aluminum halide comprises ethyl aluminum sesquichloride.

23. The catalyst preparation method of claim 18 wherein said dialkyl magnesium compound comprises dibutyl magnesium.

24. The catalyst preparation method of claim 18 wherein said dialkyl magnesium compound comprises di-n-hexyl magnesium.

25. The catalyst preparation method of claim 18 wherein said dialkyl magnesium compound comprises butyl ethyl magnesium.

26. The catalyst preparation method of claim 18 wherein said dialkyl magnesium compound comprises a magnesium complex of trialkyl aluminum.

27. The catalyst preparation method of claim 18 wherein said titanium compound comprises titanium tetraisopropoxide.

28. The catalyst preparation method of claim 18 wherein said titanium compound comprises titanium tetrachloride.

29. The catalyst preparation method of claim 18 wherein said titanium compound comprises a titanium dialkoxy dihalide.

30. The catalyst preparation method of claim 29 wherein said titanium dialkoxy dihalide comprises titanium diisopropoxide dichloride.

31. The method of claim 18 wherein the quantities of said reactive materials and said organic polymer are regulated such that said reaction product is less than about 30 percent of the total weight of said reaction product and said organic polymer particles.

32. The method of preparing a supported olefin polymerization and copolymerization catalyst active in the presence of an organometallic co-catalyst comprising mixing reactive materials comprising a lower alkyl aluminum halide, a dialkyl magnesium compound and a reducible titanium compound of the formula $Ti(OR)_nX_{4-n}$ where R is an alkyl group, X is a halogen atom, and n is an integer between 0 and 4, inclusive, in the presence of a solvent and a particulate organic polymer consisting essentially of a high density polyethylene which has chemically bonded to it between about 0.05 and about 30 weight percent of an organic carboxylic acid or acid anhydride to form a reaction product supported on said particles, and evaporating said solvent at a temperature which is less than the softening temperature of said organic polymer.

33. The catalyst preparation method of claim 32 wherein said organic polymer is an X-methyl bicyclo[2.2.1]hept-5-ene-2,3-dicarboxylic acid anhydride grafted polyethylene.

34. The method of preparing a supported olefin polymerization and copolymerization catalyst active in the presence of an organometallic co-catalyst comprising mixing reactive materials comprising a lower alkyl aluminum halide, a dialkyl magnesium compound and a reducible titanium compound of the formula $Ti(OR)_nX_{4-n}$ where R is an alkyl group, X is a halogen atom, and n is an integer between 0 and 4, inclusive, in the presence of a solvent and a particulate organic polymer to form a reaction product supported on said particles, said particulate organic polymer comprising a graft copolymer of about 70–99.95 weight percent of a polyolefin polymer and about 30–0.05 weight percent of at least one monomer selected from the group consisting of polymerizable cyclic and polycyclic ethylenically unsaturated carboxylic acids and carboxylic acid anhydrides, regulating the quantities of said reactive materials and said organic polymer such that said reaction product is less than about 30 percent of the total weight of said reaction product and said organic polymer particles, and evaporating said solvent at a temperature which is less than the softening temperature of said organic polymer.

* * * * *